US009024873B2

(12) United States Patent
Nien et al.

(10) Patent No.: US 9,024,873 B2
(45) Date of Patent: May 5, 2015

(54) CONTROL DEVICE

(75) Inventors: Chung-Yueh Nien, New Taipei (TW); Yu-Chih Cheng, New Taipei (TW); Hsiao-Long Chiang, Taipei (TW)

(73) Assignee: Chen-Min Hung, Changua County (TW)

( * ) Notice: Subject to any disclaimer, the term of this patent is extended or adjusted under 35 U.S.C. 154(b) by 571 days.

(21) Appl. No.: 13/338,943

(22) Filed: Dec. 28, 2011
(Under 37 CFR 1.47)

(65) Prior Publication Data
US 2012/0162070 A1 Jun. 28, 2012

Related U.S. Application Data

(63) Continuation-in-part of application No. 12/662,788, filed on May 4, 2010.

(30) Foreign Application Priority Data

Dec. 29, 2010 (TW) ............................... 99225383 U

(51) Int. Cl.
| G06F 3/033 | (2013.01) |
| G06F 3/0354 | (2013.01) |
| G06F 3/03 | (2006.01) |
| G06F 3/0338 | (2013.01) |

(52) U.S. Cl.
CPC ............ *G06F 3/0354* (2013.01); *G06F 3/0312* (2013.01); *G06F 3/0338* (2013.01)

(58) Field of Classification Search
CPC ..... G06F 3/033; G06F 3/0338; G06F 3/0354; G06F 3/03548; G06F 3/0362; G06F 3/042; G06F 3/0213; H01H 2019/146; H01H 25/008; Y10T 74/20201

USPC ...................... 345/156–184; 361/679.01–804
See application file for complete search history.

(56) References Cited

U.S. PATENT DOCUMENTS

| 4,724,715 | A | * | 2/1988 | Culver .......................... 74/471 R |
| 4,896,554 | A | * | 1/1990 | Culver ..................... 74/471 XY |
| 5,235,868 | A | * | 8/1993 | Culver ..................... 74/471 XY |
| 5,436,954 | A | * | 7/1995 | Nishiyama et al. ............ 455/566 |
| 5,635,926 | A | * | 6/1997 | Li ..................................... 341/20 |
| 6,337,680 | B1 | * | 1/2002 | Hamaji .......................... 345/157 |
| 6,404,415 | B1 | * | 6/2002 | Kim ............................... 345/157 |
| 6,731,267 | B1 | * | 5/2004 | Tuoriniemi et al. .......... 345/156 |
| 6,995,326 | B2 | * | 2/2006 | Sugimura et al. ............. 200/5 R |
| 7,199,792 | B2 | * | 4/2007 | Wang ............................. 345/184 |
| 8,314,771 | B2 | * | 11/2012 | Nien et al. ..................... 345/158 |

(Continued)

*Primary Examiner* — Amr Awad
*Assistant Examiner* — Roberto Flores
(74) *Attorney, Agent, or Firm* — Kirton McConkie; Evan R. Witt

(57) ABSTRACT

A control device includes a holder, a sleeve, a detecting module, and a positioning mechanism. The holder defines an accommodation chamber. The sleeve is sleeved onto the holder, wherein the sleeve is rotatable and movable on the holder. The detecting module is accommodated within the accommodation chamber for detecting a rotation and a translational movement of the sleeve. The positioning mechanism includes a positioning part and a transmission member. The positioning part is located at a side of the holder. The transmission member is connected with the holder and disposed on the positioning part. When the holder generates a first vertical displacement relative to the positioning part, the transmission member generates a second vertical displacement relative to the positioning part synchronously in response to the first vertical displacement of the holder.

15 Claims, 12 Drawing Sheets

(56) References Cited

U.S. PATENT DOCUMENTS

| | | | |
|---|---|---|---|
| 2002/0044155 A1* | 4/2002 | Becker | 345/684 |
| 2002/0126025 A1* | 9/2002 | Wang | 341/20 |
| 2003/0095100 A1* | 5/2003 | Kraynak | 345/157 |
| 2005/0248530 A1* | 11/2005 | Shinokura | 345/156 |
| 2006/0061549 A1* | 3/2006 | Chen | 345/157 |
| 2007/0202935 A1* | 8/2007 | Won et al. | 455/575.4 |
| 2007/0205920 A1* | 9/2007 | Cho | 341/35 |
| 2008/0125182 A1* | 5/2008 | Park et al. | 455/566 |
| 2008/0278443 A1* | 11/2008 | Schelling et al. | 345/157 |
| 2008/0278444 A1* | 11/2008 | Schelling et al. | 345/157 |
| 2011/0037693 A1* | 2/2011 | Chiang | 345/157 |
| 2011/0037695 A1* | 2/2011 | Bor et al. | 345/158 |
| 2011/0134031 A1* | 6/2011 | Wang et al. | 345/157 |
| 2013/0033420 A1* | 2/2013 | Nien et al. | 345/156 |

* cited by examiner

CONTROL DEVICE

CROSS-REFERENCE TO RELATED APPLICATION

This application is continuation-in-part of U.S. patent application Ser. No. 12/662,788, field May 4, 2010, and claims the priority benefit of Taiwan patent application number 099225383, filed on Dec. 29, 2010, and hereby incorporates the content of these applications by reference.

FIELD OF THE INVENTION

The present invention relates to a control device, and more particularly to a control device for controlling a cursor shown on a display screen.

BACKGROUND OF THE INVENTION

Following fast development of modern technology and the electronic industry, many kinds of consumer electronics, such as computer, mobile telephone, digital camera, personal digital assistant and etc., have entered into our daily life. Further, following popularization of network, people may use the internet to search for information on the World Wide Web. Through the internet, people can watch online favorite movies, TV shows, cartoons, music videos and much more. Through the internet, people can also play web games and online games, send e-mails, go online shopping, make a subscription or online payment, or transfer money.

Further, a computer has multiple functions, bringing convenience to the user. Further, a computer may be equipped with a keyboard and/or mouse for controlling a cursor on a display screen. When operating a computer mouse, a user may rest the wrist of the hand on the desk or a mouse pad and then move the computer mouse or click the button of the computer mouse with the fingers. However, when going to move the computer mouse over a big area, the user must lift the wrist from the desk or mouse pad. Excessive or improper use of a computer may cause pain in the wrist (the so-called carpal tunnel syndrome).

In order to eliminate this problem, wrist rests are created. A wrist rest is a device used to support the wrist while typing or when using a computer mouse. However, leaning the wrists on a wrist rest for long periods can put a lot of pressure on the undersides of the wrists. This may cause carpal tunnel syndrome to develop. Actually, a wrist rest does help align the user's hands and wrists while using the mouse. Further, an improperly used wrist rest may actually cause more repetitive stress injuries for those who mouse for extended periods of time.

Therefore, it is desirable to provide an orthopedically engineered cursor control device that eliminates the aforesaid problems.

SUMMARY OF THE INVENTION

The present invention provides a control device, which includes a sleeve and a holder. When the wrist of the user's hand is sustained against and supported on the wrist rest, the sleeve may be pushed by the user's finger, so that the sleeve is rotated forwardly/backwardly or moved leftwards/rightwards relative to the surface of the holder.

The present invention also provides a control device with a positioning mechanism for facilitating the user to operate a holder which is enclosed by a sleeve. Consequently, the control device can be operated by the user more easily without impairing the sensitivity of the control device.

In accordance with an aspect of the present invention, there is provided a control device for controlling movement of a cursor of an electronic device. The control device includes a holder, a sleeve, and a detecting module. The holder defines an accommodation chamber. The sleeve is sleeved onto the holder, wherein the sleeve is rotatable and movable on the holder. The detecting module is accommodated within the accommodation chamber for detecting a rotation and a translational movement of the sleeve.

In an embodiment, the control device further comprises a positioning mechanism includes a positioning part and a transmission member. The positioning part is located at a side of the holder. The transmission member is connected with the holder and disposed on the positioning part. When the holder generates a first vertical displacement relative to the positioning part, the transmission member generates a second vertical displacement relative to the positioning part synchronously in response to the first vertical displacement of the holder.

In an embodiment, the holder further includes a light-transmissible zone or a vacant zone sheltered by the sleeve and aligned with the detecting module.

In an embodiment, the sleeve is hard or flexible. If the sleeve is hard, the holder further includes a supporting seat for supporting the detecting module and a one-piece fixing part sheathed around the supporting seat, wherein the one-piece fixing part is coupled with at least a portion of the transmission member. Alternatively, if the sleeve is hard, the holder further includes a supporting seat for supporting the detecting module and an assembled fixing part sheathed around the supporting seat, wherein the assembled fixing part is coupled with at least a portion of the transmission member. Alternatively, if the sleeve is hard, the sleeve is made of mesh fabric, nonwoven fabric, plastic material, rubber or leather. Alternatively, if the sleeve is flexible, the holder sheathed by the sleeve has a flat, arc-shaped, circular or elliptical cross section. Alternatively, if the sleeve is flexible, a plurality of friction structures are formed on an outer surface of the sleeve, wherein the friction structures are substantially evenly distributed on the outer surface of the sleeve. Alternatively, if the sleeve is flexible, the sleeve includes a plurality of recessed structures, protrusions, embossed structures or dots, which are distributed on an inner surface of the sleeve, wherein the inner surface of the sleeve faces the detecting module. Alternatively, the sleeve further includes at least one sensing structure, which is formed on an inner surface of the sleeve, wherein the inner surface of the sleeve faces the detecting module, wherein at least one of a relative rotation and a relative translational movement between the sensing structure and the detecting module is detected by the detecting module.

In an embodiment, the transmission member further includes a pressing part. In addition, the control device further includes a bottom shell and a contact sensor, wherein the contact sensor is disposed on the bottom shell and aligned with the pressing part, and the positioning part is affixed on the bottom shell. When the holder has the first vertical displacement relative to the positioning part, the contact sensor is triggered by the pressing part, so that a clicking control signal is generated. Alternatively, the control device further includes a bottom shell and a non-contact sensor, wherein the non-contact sensor is disposed on the bottom shell and aligned with the pressing part, and the positioning part is affixed on the bottom shell. When the holder has the first vertical displacement relative to the positioning part, the pressing part has the second vertical displacement relative to the positioning part and is interfered with the non-contact sensor, so that a clicking control signal is generated. Alternatively, the control device further includes a circuit module for supporting the detecting module, wherein the circuit module includes a microprocessor, and the detecting module is in communication with the microprocessor, wherein the detecting module issues a rotating control signal or a moving control signal to the microprocessor. Alternatively, the control device further includes a bottom shell, a clicking signal sensor and a circuit module, wherein the clicking signal sensor is disposed on the bottom shell and aligned with the pressing part, the circuit module is disposed on the bottom shell, and the positioning part is affixed on the bottom shell. When the pressing part has the second vertical displacement in response to the first vertical displacement of the holder, the clicking signal sensor is triggered by the pressing part, so that a clicking control signal is generated and issued to the circuit module.

In an embodiment, the positioning part includes a positioning shaft parallel with the holder. The transmission member includes two extension coupling parts and a pressing part, wherein the two extension coupling parts are respectively affixed on both ends of the positioning shaft, and the pressing part is affixed on the positioning shaft and arranged between the two extension coupling parts. The second vertical displacement of the pressing part is smaller than the first vertical displacement. Alternatively, the positioning part includes a positioning shaft parallel with the holder. The transmission member includes two extension coupling parts and two pressing parts, wherein the two extension coupling parts are respectively affixed on both ends of the positioning shaft, and the two pressing parts are respectively located beside the two extension coupling parts. The second vertical displacement of the pressing part is smaller than or equal to the first vertical displacement. Alternatively, the positioning part includes two positioning rods vertical to the holder and respectively located at both ends of the holder, and the transmission member includes two extension coupling parts, wherein each of the extension coupling parts are affixed on both ends of a corresponding positioning rod, and the two extension coupling parts are respectively affixed on the both ends of the holder.

In an embodiment, the control device further includes a bottom shell, a circuit module, and a peripheral device. The positioning mechanism is disposed on the bottom shell. The circuit module is disposed on the bottom shell. The peripheral device is in communication with the circuit module in the manner of a wire or wireless transmission. The peripheral device includes a keyboard with a plurality of keys and a 3D wheel, a touchpad, a touch display panel, a handheld scanning device, a feeding scanning device, a projection module, a camera module, an industrial computer or host, a commercial computer or host, a medical computer or host, a handheld electronic device, or a combination of at least two of the peripheral devices.

In accordance with another aspect of the present invention, there is provided a control device for controlling movement of a cursor of an electronic device. The control device includes a holder, a sleeve, a detecting module, a control module, and a circuit module. The holder defines an accommodation chamber therein. The sleeve is sleeved onto the holder, wherein the sleeve is rotatable and movable relative to the holder. The detecting module is accommodated within the accommodation chamber for detecting a rotation and a translational movement of the sleeve. The control module at least includes a peripheral device. The circuit module is in communication with the detecting module and in communication with the peripheral device.

In an embodiment, the holder further includes a light-transmissible zone or a vacant zone, which is sheltered by the sleeve and aligned with the detecting module.

In an embodiment, the sleeve is hard or flexible. If the sleeve is hard, the holder further includes a supporting seat for supporting the detecting module and a one-piece fixing part sheathed around the supporting seat, wherein the one-piece fixing part is coupled with at least a portion of the transmission member. Alternatively, if the sleeve is hard, the holder further includes a supporting seat for supporting the detecting module and an assembled fixing part sheathed around the supporting seat, wherein the assembled fixing part is coupled with at least a portion of the transmission member. Alternatively, if the sleeve is hard, the sleeve is made of mesh fabric, nonwoven fabric, plastic material, rubber or leather. Alternatively, if the sleeve is flexible, the holder sheathed by the sleeve has a flat, arc-shaped, circular or elliptical cross section. Alternatively, if the sleeve is flexible, a plurality of friction structures are formed on an outer surface of the sleeve, wherein the friction structures are substantially evenly distributed on the outer surface of the sleeve. Alternatively, if the sleeve is flexible, the sleeve includes a plurality of recessed structures, protrusions, embossed structures or dots, which are distributed on an inner surface of the sleeve, wherein the inner surface of the sleeve faces the detecting module. Alternatively, the sleeve further includes at least one sensing structure, which is formed on an inner surface of the sleeve, wherein the inner surface of the sleeve faces the detecting module, wherein at least one of a relative rotation and a relative translational movement between the sensing structure and the detecting module is detected by the detecting module.

In an embodiment, the control device further includes a bottom shell for accommodating the peripheral device and connecting with the peripheral device. The peripheral device is operable when the peripheral device is detached from the bottom shell. The peripheral device is in communication with the circuit module in the manner of a wire or wireless transmission. The peripheral device includes a handheld scanning device, a feeding scanning device, a projection module, a camera module, a keyboard with at least one key and a 3D wheel, or a combination of at least two of the peripheral devices. Alternatively, the control device further includes a bottom shell for accommodating the peripheral device and the circuit module. The peripheral device is in communication with the circuit module in the manner of a wire or wireless transmission. The peripheral device includes a touchpad, a touch display panel, a handheld scanning device, a feeding scanning device, a projection module, a camera module, a keyboard with at least one key and a 3D wheel, or a combination of at least two of the peripheral devices. Alternatively, the control device further includes the peripheral device. The peripheral device is in communication with the circuit module in the manner of a wire or wireless transmission. The peripheral device includes a handheld scanning device, a feeding scanning device, a projection module, a camera module, an industrial computer or host, a commercial computer or host, a medical computer or host, a handheld electronic device, a keyboard with a plurality of keys and a 3D wheel, or a combination of at least two of the peripheral devices.

In an embodiment, control device further includes a positioning mechanism. The positioning mechanism includes a positioning part and a transmission member. The positioning part is located at a side of the holder, and the transmission member is connected with the holder and disposed on the positioning part. When the holder generates a first vertical displacement relative to the positioning part, the transmission member generates a second vertical displacement relative to the positioning part by in response to the first vertical displacement of the holder.

In an embodiment, in case of comprising the positioning mechanism, the transmission member further includes a pressing part. In addition, the control member further includes a bottom shell and a contact sensor, wherein the contact sensor is disposed on the bottom shell and aligned with the pressing part, and the positioning part is affixed on the bottom shell. When the holder has the first vertical displacement relative to the positioning part, the contact sensor is triggered by the pressing part, so that a clicking control signal is generated and issued to the circuit module. Alternatively, the control member further includes a bottom shell and a non-contact sensor, wherein the non-contact sensor is disposed on the bottom shell and aligned with the pressing part, and the positioning part is affixed on the bottom shell. When the holder has the first vertical displacement relative to the positioning part, the pressing part has the second vertical displacement relative to the positioning part and is interfered with the non-contact sensor, so that a clicking control signal is generated and issued to the circuit module. Alternatively, the control member further includes a bottom shell, a clicking signal sensor and a circuit module, wherein the clicking signal sensor is disposed on the bottom shell and aligned with the pressing part, the circuit module is disposed on the bottom shell, and the positioning part is affixed on the bottom shell. When the pressing part has the second vertical displacement in response to the first vertical displacement of the holder, the clicking signal sensor is triggered by the pressing part, so that a clicking control signal is generated and issued to the circuit module.

In an embodiment, in case of comprising the positioning mechanism, the positioning part includes a positioning shaft parallel with the holder. The transmission member includes two extension coupling parts and a pressing part, wherein the two extension coupling parts are respectively affixed on both ends of the positioning shaft, and the pressing part is affixed on the positioning shaft and arranged between the two extension coupling parts. The second vertical displacement of the pressing part is smaller than the first vertical displacement. Alternatively, the positioning part includes a positioning shaft parallel with the holder. The transmission member includes two extension coupling parts and two pressing parts, wherein the two extension coupling parts are respectively affixed on both ends of the positioning shaft, and the two pressing parts are respectively located beside the two extension coupling parts. The second vertical displacement of the pressing part is smaller than or equal to the first vertical displacement. Alternatively, the positioning part includes two positioning rods vertical to the holder and respectively located at both ends of the holder, and the transmission member includes two extension coupling parts, wherein each of the extension coupling parts are affixed on both ends of a corresponding positioning rod, and the two extension coupling parts are respectively affixed on the both ends of the holder.

In an embodiment, the peripheral device is in communication with the circuit module in the manner of a wire or wireless transmission. The peripheral device includes a handheld scanning device, a feeding scanning device, a projection module, a camera module, an industrial computer or host, a commercial computer or host, a medical computer or host, a handheld electronic device, a keyboard with a plurality of keys and a 3D wheel, a touchpad, a touch display panel, or a combination of at least two of the peripheral devices.

In an embodiment, the circuit module includes a microprocessor. The detecting module is in communication with the microprocessor. The detecting module issues at least one of a rotating control signal and a moving control signal to the microprocessor.

In an embodiment, the control module is in communication with the circuit module in the manner of a wire or wireless transmission. The control module includes at least one mechanical key, a touchpad, a touch display panel, a wheel, a non-contact panel or a display panel, a keyboard with at least one key and a 3D wheel, or a combination of at least two of the control modules.

To achieve this and other objects of the present invention, an operation control device comprises a housing, a control module and a circuit module. The control module and the circuit module are accommodated in the housing. The housing has an elongated slot located on the top side thereof. The control module comprises a carrier frame mounted in the housing, and a movable operating device supported on the carrier frame and suspending in the elongated slot and peripherally partially protruding over the top side of the housing for operation by the user. The circuit module comprises a circuit board carrying a microprocessor, a sensor module electrically connected to the microprocessor and adapted for sensing the direction and amount of rotation of the movable operating device, and two magnetic sensors respectively electrically connected to the microprocessor and adapted for sensing the direction and amount of axial displacement of the movable operating device. Thus, the user can rest the wrists of the hand on a wrist pad at the front side of the housing, and then rotate or slide the movable operating device to control the functioning of a cursor on a display screen of an electronic apparatus with which operation control device is used. This human-friendly design does not cause the user's fingers to ache after a long operation, assuring operating stability and comfort.

Further, the movable operating device of the control module comprises an elongated base member (supporting seat), and a sleeve sleeved onto the elongated base member and rotatable and axially slidable by the user relative to the elongated base member. Further, the sensor module is mounted in the elongated base member and surrounded by the sleeve. Therefore, the sleeve protects the sensor module against outside dust and micro particles and keeps the sensor module from sight, assuring sensing accuracy of the sensor module and saving the surface space of the circuit board of the circuit module. Thus, the invention has small-sized and nice-looking characteristics.

Further, each magnetic sensor consists of a lever (pushing seat) pivotally mounted in the housing and biasable by the movable operating device, a magnet located on one end of the lever, and a magnetic sensing element adapted for sensing the strength of the magnetic field induced by the magnet that is indicative of the direction and amount of axial displacement of the movable operating device. Subject to the non-contact sensing operation of the magnetic sensors, the invention effectively and accurately senses the amount and direction of the displacement of the movable operating device and eliminates the drawbacks of mechanical fatigue and contact error of conventional contact switch designs.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
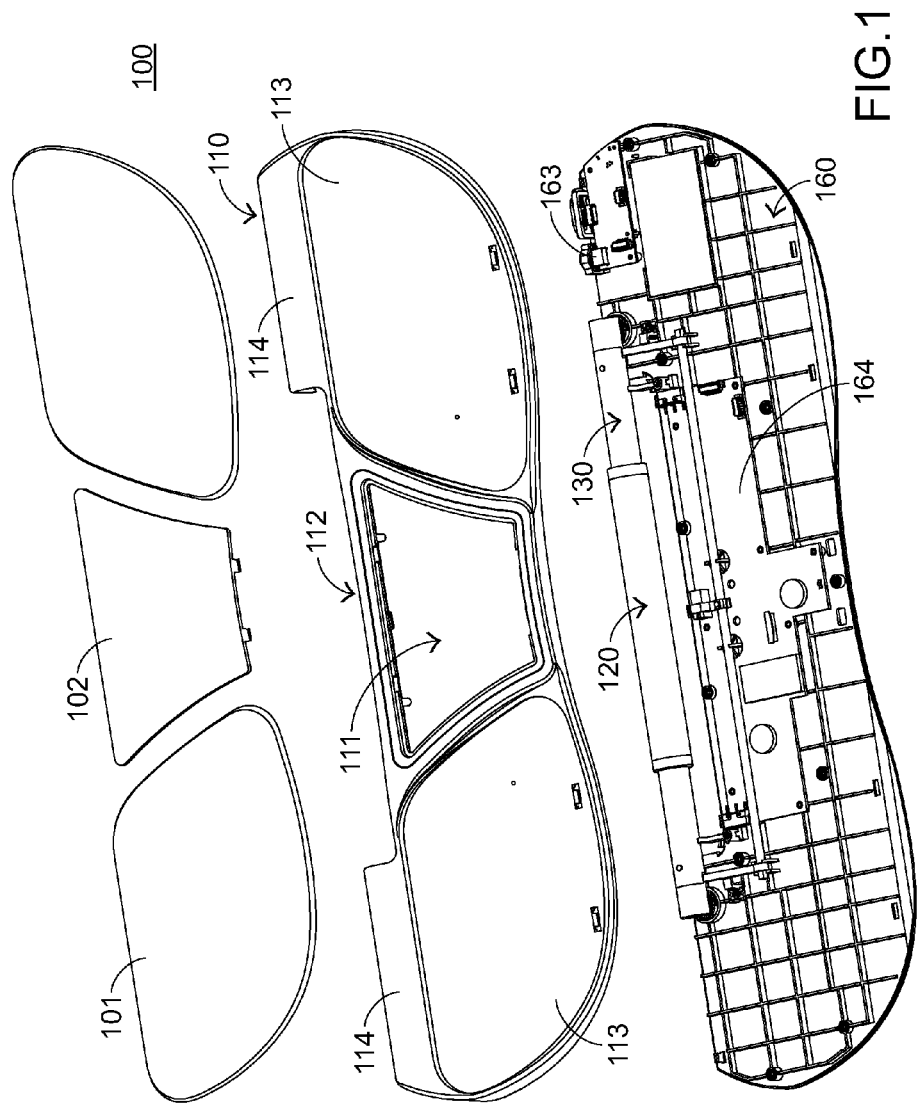
FIG. 1 is a schematic exploded view illustrating a control device according to a first embodiment of the present invention.

The present invention provides a control device. In addition, a control member may be accommodated within the control device of the present invention. In an embodiment, the control member is accommodated within an accommodation chamber of the control device and the portion thereof may be exposed for user's operation.

The present invention also provides a control module. The control module may be accommodated within the control device of the present invention and the portion thereof may be exposed for user's operation. The control module may comprise the control member. Optionally, the control module is accommodated within an accommodation chamber of the control device. During operated by a user, the control module may be detached from the accommodation chamber of the control device or still placed within the accommodation chamber of the control device, so that the control module is served as a peripheral device to be operated by the user. Alternatively, the peripheral device and the control device may be integrated into a machine and cooperated with each other.

The control module may have some or all functions corresponding to the control device of the present invention. In an embodiment, the control module is used for performing at least a portion of functions of a general mouse. For example, the control module is capable of controlling a motion, a positioning action, a clicking action or a rotation of the cursor shown on the display screen. Under this circumstance, the control module and the control device of the present invention are cooperated with each other to perform the functions of the general mouse (e.g. a touchpad, a wheel or a 3D wheel). Optionally, the control module is used for performing a non-mouse function. For example, the control module may comprise a numerical key, a hot key, a function key or a power key of a general keyboard. Under this circumstance, the control module and the control device of the present invention are cooperated with each other to perform the functions of the general keyboard and the general mouse. Optionally, the control module is used for performing the functions other than the general keyboard, so that the control module is served as a peripheral device. For example, the control module is in communication with the control device in the manner of a wire or wireless transmission. An example of the peripheral device includes but is not limited to a keyboard with at least one key and a 3D wheel, a touchpad, a touch display panel, a handheld scanning device, a feeding scanning device, a projection module, a camera module, an industrial computer or host, a commercial computer or host, a medical computer or host, a handheld electronic device, or a combination of at least two of the peripheral devices.

Accordingly, the control module may be in communication with the control device in the manner of wire or wireless transmission or both. In addition, the control module may be electrically connected to or in communication with the external device through the control device of the present invention. In a case that the control module is electrically connected to or in communication with the external device through the control device of the present invention, the electrical signals from the control module and the signals from the control device may be alternately and automatically switched to communicate with the external device, or manually switched to communicate with the external device. The concepts of the present invention are not limited to the control module or the peripheral device that is in communication with the control device of the present invention in the above manner.

Accordingly, the control module of the present invention may have diversified configurations according to different functions. In an embodiment, the control module may include at least one mechanical key in response to pressing force from a user, or a keyboard with at least one key and a 3D wheel. Optionally, the control module may include a touch-sensitive interface member in response to touching force of the user. For example, the touch-sensitive interface member is a touchpad, a 3D wheel or a wheel. Optionally, the control module may include an inductive peripheral operating module for sensing an impending change of the user. For example, the inductive peripheral operating module is a non-contact panel or a display panel. Optionally, the control module may include a peripheral device in response to moving force from user. For example, the peripheral device is a scanning module for translation-scanning a document.

Figure 2:
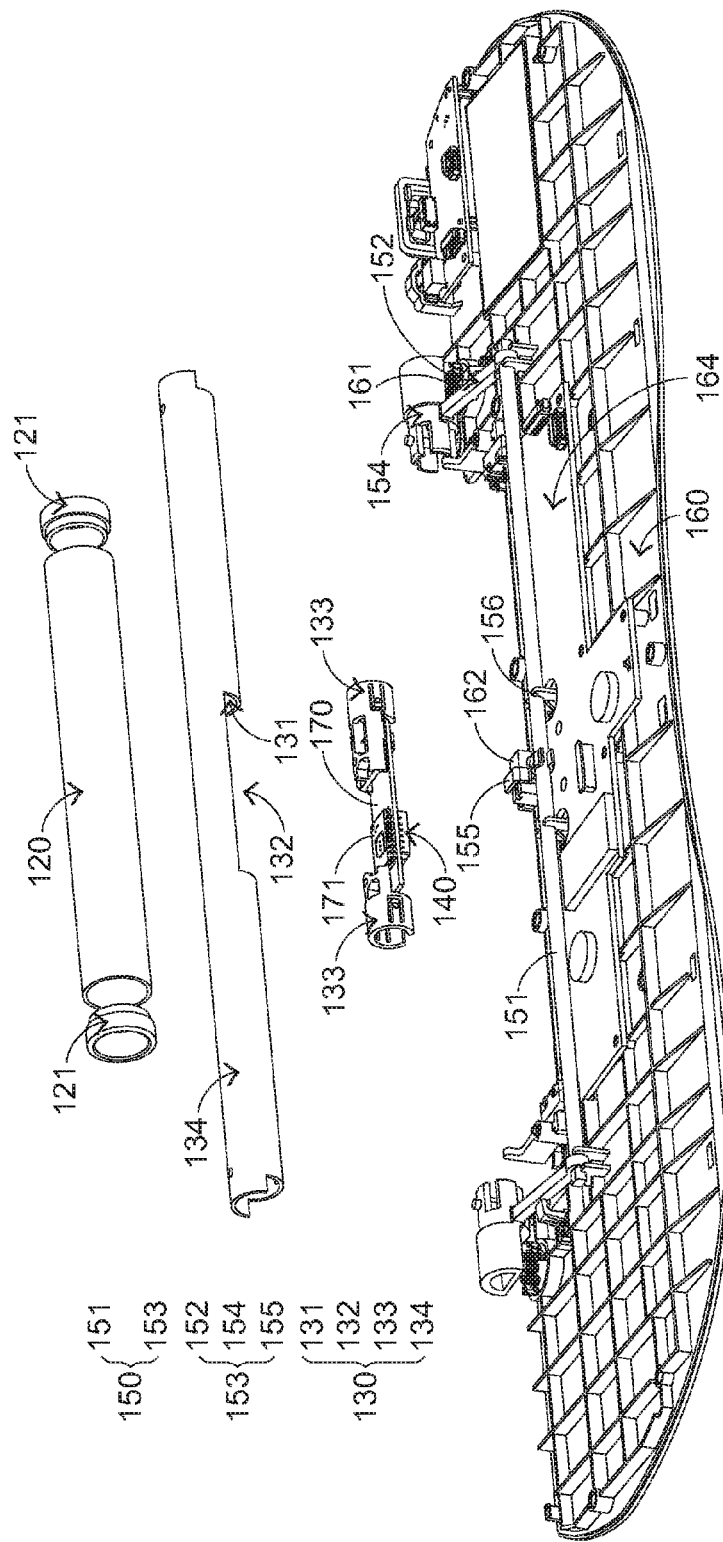
FIG. 2 is a schematic exploded view illustrating some components of the control device according to the first embodiment of the present invention.

FIG. 1 is a schematic exploded view illustrating a control device according to a first embodiment of the present invention. FIG. 2 is a schematic exploded view illustrating some components of the control device according to the first embodiment of the present invention. As shown in FIG. 1, the control device 100 comprises a wrist rest 101, a plaque 102, a housing 110, a sleeve 120, a holder 130, a detecting module 140, a positioning mechanism 150, and a bottom shell 160.

The housing 110 is affixed on the bottom shell 160. An operating space is defined between the housing 110 and the bottom shell 160 for accommodating other modules (e.g. a circuit module or a control module, not shown) or a connecting interface 163, which will be described later. A hollow part 111, a notch 112 and a concave structure 113 are formed in the surface of the housing 110. The hollow part 111 is in communication with the operating space. The plaque 102 is accommodated within the hollow part 111. The wrist rest 101 is accommodated within the concave structure 113. The plaque 102 may be replaced by a touchpad (not shown) or a roller for the operation of the user. In addition, two receiving recesses 114 are located at bilateral sides of the notch 112, respectively. The receiving recess 114 is used for accommodating a corresponding holder 130. The sleeve 120 is exposed to the notch 112.

The sleeve 120 has an axial hole. Consequently, the sleeve 120 is sleeved onto the holder 130 and exposed to the notch 112. The user may operate the sleeve 120 to rotate or move the sleeve 120 relative to the holder 130. It is noted that the holder 130 with a length longer path than the sleeve 120 to allow the sleeve 120 to be moved on the holder 130 and relative to the holder 130. The sleeve 120 may be hard or flexible. In the case of the hard sleeve 120, the sleeve 120 has an affixed shape to be sleeved onto the holder 130. In a case that the sleeve 120 is flexible, the shape of the holder 130 is adjustable according to the holder 130. In the first embodiment, the sleeve 120 is hard, which is made of mesh fabric, nonwoven fabric, plastic material, rubber or leather. In addition, an image or a character may be clearly formed on an outer surface of the sleeve 120 by a laser engraving technology, a transfer printing technology or an etching technology. Moreover, two docking parts 121 are located at both ends of the sleeve 120, respectively. Via the docking parts 121, the sleeve 120 is connected with the holder 130. The docking parts 121 have the function of assisting in moving the sleeve 120 on the holder 130.

The holder 130 comprises an one-piece fixing part or an assembled fixing part. In the first embodiment, the one-piece fixing part 134 is a cylindrical bar or an elliptic cylindrical bar. Alternatively, the one-piece fixing part 134 may have any shape for facilitating the sheathing, rotating and translational movement of the sleeve 120. For example, the one-piece fixing part 134 is made of polyoxymethylene (POM), polytetrafluoroethylene (PTFE), ultra high molecular weight polyethylene (UHMWPE) or any of a variety of other suitable self-lubricating materials.

An accommodation chamber 131 is defined within the holder 130 for accommodating the detecting module 140, which is supported on a supporting seat 133. In addition, the one-piece fixing part 134 of the holder 130 has a vacant zone 132, and the detecting module 140 is exposed to the vacant zone 132. That is, the vacant zone 132 is aligned with the detecting module 140. The vacant zone 132 of the holder 130 is sheltered by the sleeve 120 when the sleeve 120 is sleeved onto the holder 130 and moved on the holder 130 leftwards and rightwards. The vacant zone 132 is produced or formed in a surface of the one-piece fixing part 134 (i.e. a hollow bar). Optionally, the vacant zone 132 may be covered by a transparent cover (not shown), or a light-transmissible zone made of a transparent material is produced or formed as a portion or the whole of the one-piece fixing part 134.

In a case that the holder 130 comprises the vacant zone 132 or the light-transmissible zone, the detecting module 140 includes one or more optical non-contact sensors for detecting the rotation or the translational movement (or both) of the sleeve 120, thereby generating a rotating control signal or a moving control signal. Alternatively, in a case that the holder 130 has no vacant zone 132 or light-transmissible zone, the detecting module 140 includes one or more non-optical non-contact sensors, wherein the one or more non-contact sensors may be distributed in the accommodation chamber 131 of the holder 130. Under this circumstance, the sleeve 120 can include a sensing structure or be made of sensing material which may be interacted with the non-optical non-contact sensors. Consequently, the detecting module 140 can also detect the rotation or the translational movement (or both) of the sleeve 120, thereby generating a rotating control signal or a moving control signal.

Moreover, a circuit module 170 is affixed on the supporting seat 133 of the holder 130 for supporting the detecting module 140. The circuit module 170 further comprises a microprocessor 171. The rotating control signal or the moving control signal outputted from the detecting module 140 is transmitted to the microprocessor 171. After the rotating control signal or the moving control signal is processed by the microprocessor 171, the processed rotating control signal or the processed moving control signal is transmitted to the connecting interface 163 on the bottom shell 160, thereby controlling the movement of a cursor (not shown) on a display screen of an external electronic device.

Moreover, the positioning mechanism 150 comprises a positioning part 151 and a transmission member 153 including two sheathing parts 154 and two extension coupling parts 152. The positioning part 151 is a stick, which is parallel to the holder 130 and affixed on a positioning shaft of the bottom shell 160. The positioning part 151 is located at one side (e.g. a front side or a rear side) of the holder 130. In the first embodiment, the positioning part 151 is located at the front side of the holder 130, and affixed on the bottom shell 160 through a supporting part 156. The both ends of the positioning part 151 are affixed on the extension coupling part 152 of the transmission member 153. The extension coupling part 152 of the transmission member 153 is extended to and connected to the holder 130. In the first embodiment, each extension coupling part 152 is affixed at an end of the transmission member 153 through the sheathing parts 154.

Moreover, at the position corresponding to the sheathing part 154, an elastic element 161 is affixed on the bottom shell 160 and sustained against the sheathing part 154. Consequently, the holder 130 is floated over the bottom shell 160 to be in the suspending state. Moreover, the transmission member 153 further comprises a pressing part 155, which is affixed on the stick body of the positioning part 151 and located at a left side or a right side of the transmission member 153. That is, the pressing part 155 is arranged between the two extension coupling parts 152. In the first embodiment, the pressing part 155 is arranged between the positioning part 151 and the holder 130. Moreover, the pressing part 155 is substantially a plate in stepped configuration. A clicking signal sensor 162 is disposed on the bottom shell 160 and corresponding to the pressing part 155.

In an embodiment, the clicking signal sensor 162 is a contact sensor. The holder 130 generates a first vertical displacement relative to the positioning part 151 in response to downward force imposed on the holder 130 by a user, and further compress the elastic element 161. In response to the first vertical displacement of the holder 130 synchronously, the pressing part 155 generates a second vertical displacement relative to the positioning part 151, so that the clicking signal sensor 162 is touched by the pressing part 155. At the moment when the clicking signal sensor 162 is touched by the pressing part 155, a clicking control signal is generated. Moreover, another circuit module 164 is disposed on the bottom shell 160. The clicking control signal outputted from the clicking signal sensor 162 is transmitted to the circuit module 164. After the clicking control signal is processed by the circuit module 164, the processed clicking control signal is transmitted to the connecting interface 163. In this embodiment, the magnitude of the first vertical displacement is different from the magnitude of the second vertical displacement. For example, the second vertical displacement may be smaller than (but is not limited to be smaller than) the first vertical displacement.

Alternatively, the clicking signal sensor 162 is a non-contact sensor. Under this circumstance, when the pressing part 155 generates the second vertical displacement in response to the first vertical displacement of the holder 130 and the non-contact sensor 162 is interfered by the pressing part 155, a clicking control signal is generated. After the clicking control signal is processed by the circuit module 164, the processed clicking control signal is transmitted to the connecting interface 163.

Figure 3:
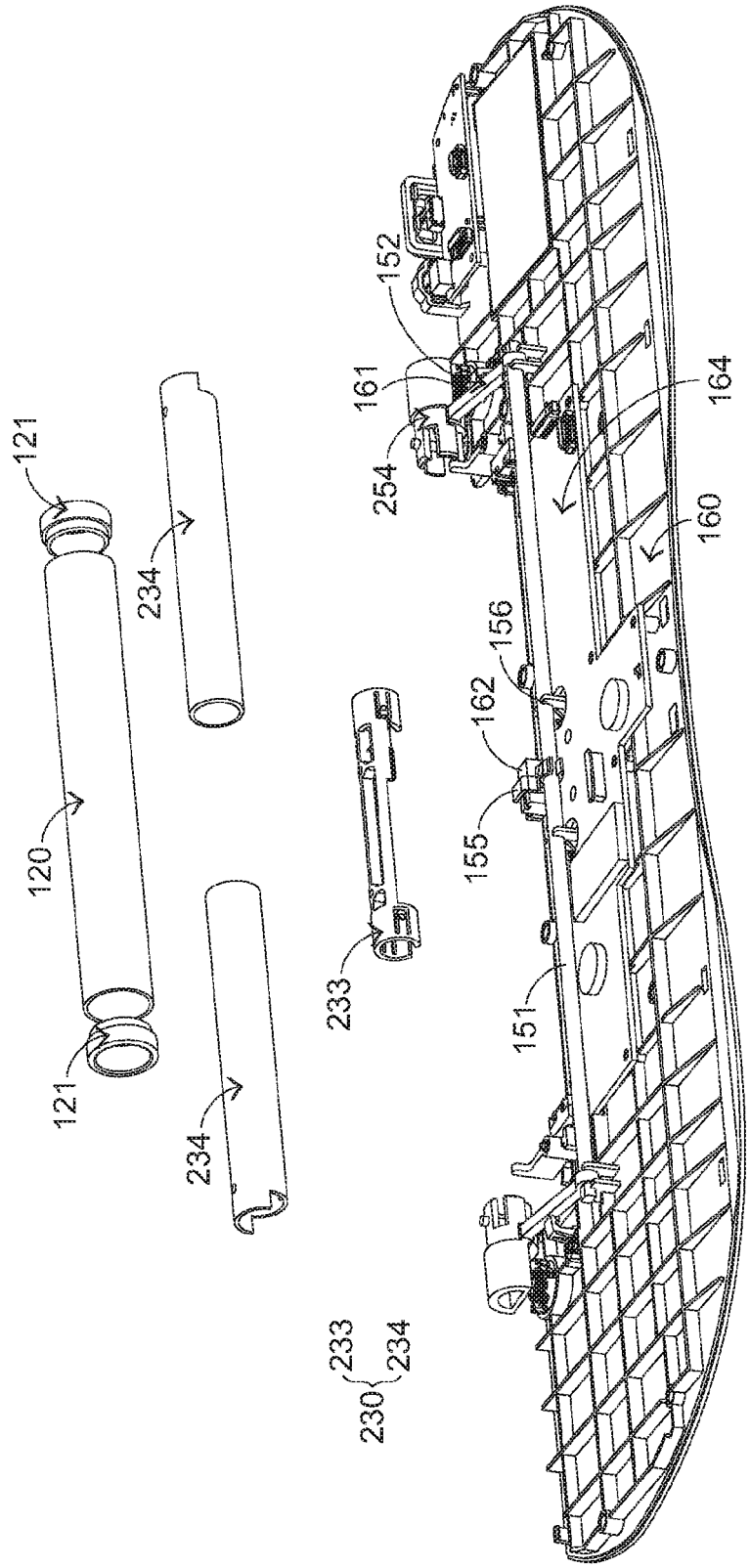
FIG. 3 is a schematic exploded view illustrating some components of the control device according to a second embodiment of the present invention.

FIG. 3 is a schematic exploded view illustrating some components of the control device according to a second embodiment of the present invention. In comparison with the first embodiment, the holder 230 of this embodiment comprises a supporting seat 233 and two assembled fixing parts 234. The two assembled fixing parts 234 are sheathed around both ends of the supporting seat 233, respectively. In addition, the assembled fixing parts 234 are connected to the sheathing parts 254 of the transmission member 153 of the positioning mechanism, respectively.

Figure 4:
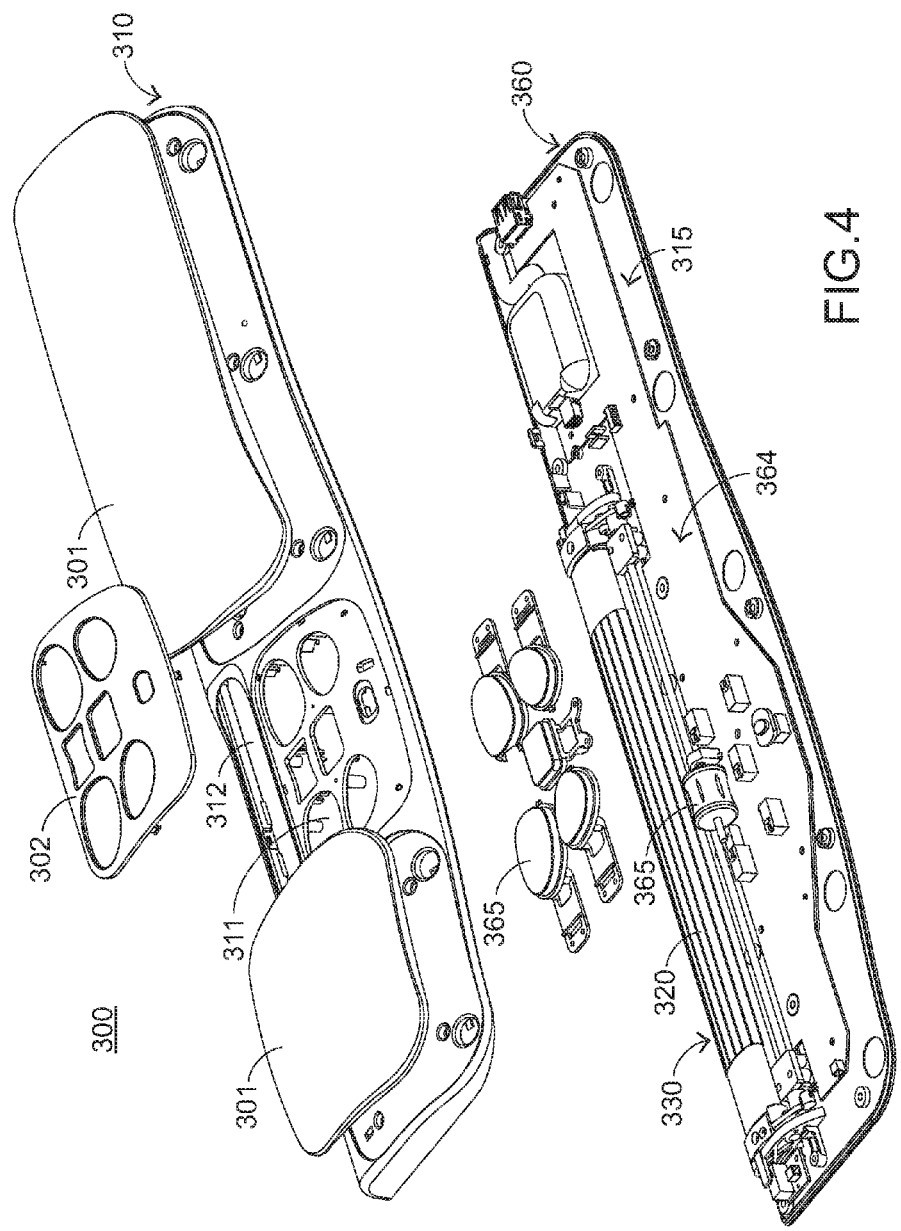
FIG. 4 is a schematic exploded view illustrating a control device according to a third embodiment of the present invention.
Figure 5:
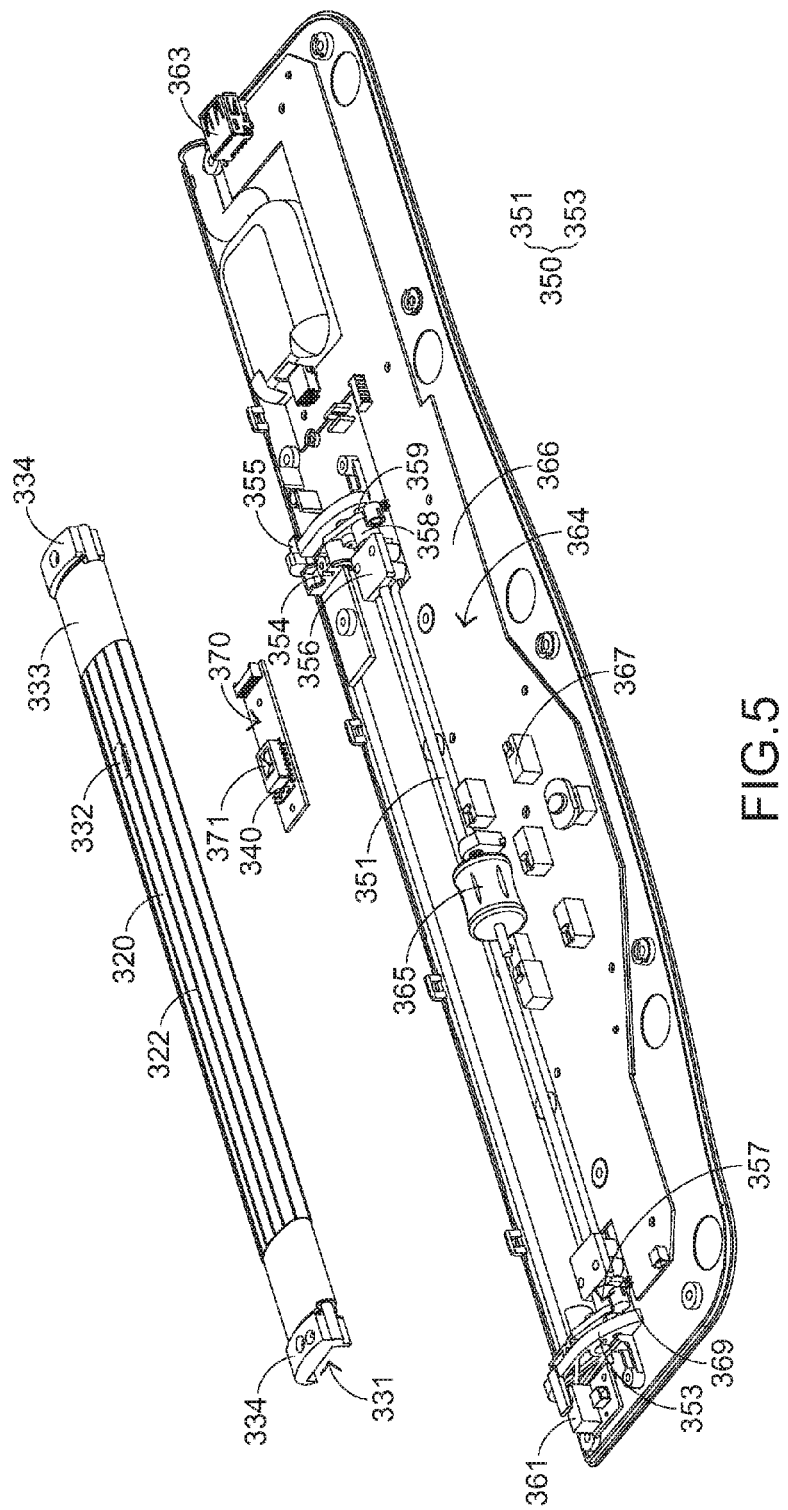
FIG. 5 is a schematic exploded view illustrating some components of the control device according to the third embodiment of the present invention.

FIG. 4 is a schematic exploded view illustrating a control device according to a third embodiment of the present invention. FIG. 5 is a schematic exploded view illustrating some components of the control device according to the third embodiment of the present invention. As shown in FIGS. 4 and 5, the control device 300 comprises a holder 330, a circuit module 370, another circuit module 364, a sleeve 320, a housing 310, and a bottom shell 360. In this embodiment, an operating space 315 is defined between the bottom shell 360 and the housing 310. The operating space 315 can accommodate most components (e.g. the holder 330, the circuit module 364, the sleeve 320, and a plurality of control members 365) of the control device 300.

A hollow part 311 and a slot 312 are formed in the housing 310. The control members 365 are disposed under the hollow part 311 and exposed to the hollow part 311. The sleeve 320 is sleeved onto the holder 330 and exposed to the slot 312. In addition, a wrist rest 301 and a plaque 302 are disposed on the housing 310. The wrist rest 301 is made of a soft material or an elastic material. The wrist rest 301 is a device used to support the wrist. The plaque 302 also has a plurality of apertures at the position corresponding to the hollow part 311 to expose the underlying control members 365.

Most components of the control device 300 are accommodated within the operating space 315, and affixed on the bottom shell 360. In the third embodiment, the circuit module 364 comprises a circuit board 366, which is affixed on the bottom shell 360. A plurality of control switches 367 and the control members 365 are mounted on the circuit board 366. In addition, some of the control switches 367 are aligned with corresponding control members 365 that are disposed over the control switches 367. The control member 365 may include a key, a wheel, a 3D wheel or any other operable element by a user's hand. The function of controlling a mouse cursor is achievable by simply pressing or rotating the control member 365 to trigger a corresponding control switch 367 of the circuit module 364. The example of the control member 365 is presented herein for purpose of illustration and description only. It is noted that numerous modifications and alterations may be made while retaining the teachings of the invention.

The circuit module 364 further comprises a connecting interface 363, which is located at one side of the circuit board 366. Optionally, a hollow recess (not shown) is formed at a lateral edge of the housing 310, and the connecting interface 363 is penetrated through the hollow recess. In the third embodiment, the circuit module 364 comprises a circuit board 366. Alternatively, the circuit module 364 may comprise a plurality of individual circuit boards rather than a single circuit board. Other circuit modules which will be described as follows may be integrated into the above circuit module or may be independent circuit modules. For designing the independent circuit modules, the independent circuit modules may be in communication with each other or an external electronic device through wires (or transmission lines) and the connecting interface, or the independent circuit modules may separately transmit and receive signals.

The holder 330 is accommodated within the operating space 315, and located at a front side of the circuit module 364. In addition, the holder 330 is aligned with the slot 312 of the housing 310. The holder 330 comprises a strip-like supporting seat 333 and two fixing parts 334. The two fixing parts 334 are affixed at both ends of the holder 330, respectively. Moreover, the positioning mechanism 350 comprises positioning part 351. The positioning part 351 is arranged between the holder 330 and the circuit module 364. Each of the both ends of the positioning part 351 is penetrated through a corresponding pushing seat 357 and a corresponding transmission member 353. After the positioning part 351 is penetrated through a pivotal hole 358 of the corresponding pushing seat 357 and an elastic element (not shown), the positioning part 351 is inserted into a pivotal hole 359 of the corresponding transmission member 353. The positioning part 351 is directly affixed on the bottom shell 360 through a supporting part 356 of the positioning mechanism 350. Alternatively, the positioning part 351 is affixed on the bottom shell 360 through any other supporting part (not shown). An example of the supporting part includes but is not limited to a positioning shaft.

The pushing seat 357 is movable on the positioning part 351. In a case that an external force is exerted on the pushing seat 357 along a longitudinal direction of the positioning part 351, the pushing seat 357 is moved toward the transmission member 353 to compress the elastic element on the positioning part 351. Moreover, due to the elastic potential energy of the compressed elastic element, the pushing seat 357 is returned to the original position where no external force is exerted on the pushing seat 357. In addition, a magnet (not shown) may be disposed within the pushing seat 357. A magnetic sensor 369 is mounted on the circuit board 366 and located near the pushing seat 357. For example, the magnetic sensor 369 is a Hall IC sensor or a magnetoresistive sensor (MR sensor). When the pushing seat 357 is moved in a direction close to or away from the transmission member 353, the magnetic field of the magnet applied to the magnetic sensor 369 is changed. Under this circumstance, the variance of the magnetic field is detected by the magnetic sensor 369. When the variance of the magnetic field or the magnitude of the magnetic field reaches a predetermined value, the magnetic sensor 369 generates a reset control signal to the circuit module 364. The reset control signal is further outputted from the connecting interface 363 to control a cursor reset of the external electronic device.

Moreover, the transmission member 353 further comprises a pressing part 355 and a sheathing part 354. The pressing part 355 and the sheathing part 354 are located at the position corresponding to the holder 330. The sheathing part 354 is connected with the fixing part 334 of the holder 330, so that the holder 330 is sustained against the transmission member 353 to be in the suspending state. A control switch 361 is disposed under the pressing part 355. The control switch 361 is in contact with the pressing part 355, so that the holder 330 in a suspending state is floated over the bottom shell 360. The transmission member 353 is rotatable relative to the positioning part 351. When a downward force is exerted on the holder 330, the holder 330 generates a first vertical displacement relative to the positioning part 351, so that the transmission member 353 is driven to rotate. In response to the first vertical displacement of the holder 330, the pressing part 355 generates a second vertical displacement relative to the positioning part 351, so that the control switch 361 is pressed by the pressing part 355. At the moment when the control switch 361 is pressed by the pressing part 355, a triggering signal is generated. In this embodiment, the magnitude of the first vertical displacement is substantially equal to the magnitude of the second vertical displacement. After the downward force is eliminated, the pressing part 355 is returned to the original position where the pressing part 355 is only in contact with the control switch 361.

The sleeve 320 has an axial hole to be sleeved onto the supporting seat 333 of the holder 330. The length of the sleeve 320 along the longitudinal axis is shorter than the length of the supporting seat 333, so that the sleeve 320 is movable or rotatable on the supporting seat 333. The supporting seat 333 of the holder 330 may has a flat, arc-shaped, circular or elliptical cross section. Alternatively, the supporting seat 333 may have any shape for facilitating the sheathing, rotating and translational movement of the sleeve 320. The supporting seat 333 is made of polyoxymetylene (POM), polytetrafluoroethylene (PTFE), ultra high molecular weight polyethylene (UHMWPE) or any of a variety of other suitable self-lubricating materials. The supporting seat 333 of the holder 330 may be made of any other suitable material such as a steel material or a plastic material with few parting lines or no parting lines as long as the sleeve 320 can be rotated or moved on the supporting seat 333. In addition, the holder 330 has a light-transmission zone, which is sheathed by the sleeve 320, or a vacant zone 332. The light-transmission zone or the vacant zone 332 is aligned with the circuit module 370 of the detecting module 340. In a case that the supporting seat 333 is made of an opaque material, the vacant zone 332 is formed in the opaque main body of the supporting seat 333, or the vacant zone 332 is further covered by a transparent cover. Alternatively, the supporting seat 333 may comprise a light-transmissible portion and an opaque portion, wherein the opaque portion is aligned with the detecting module 340. Alternatively, the supporting seat 333 is completely made of a transparent material, so that the main body of the supporting seat 333 may provide a light-transmissible zone corresponding to the detecting module 340.

An accommodation chamber 331 is defined within the holder 330 and disposed within or under the supporting seat 333. The circuit module 370 is accommodated within the accommodation chamber 331. The circuit module 370 comprises the detecting module 340 and a microprocessor 371, which are in communication with each other. The detecting module 340 is used for detecting the rotation or the translational movement of the sleeve 320, thereby generating a rotating control signal or a moving control signal. The rotating control signal or the moving control signal outputted from the detecting module 340 is transmitted to the microprocessor 371 and processed by the microprocessor 371.

The sleeve 320 may be made of a suitable material in order to provide desired elasticity and flexibility. For example, the sleeve 320 is made of mesh fabric, nonwoven fabric, plastic material, rubber or leather. Moreover, several friction structures 322 are formed on the outer surface of the sleeve 320 for providing a friction force for facilitating the user to rotate or move the sleeve 320. For example, the friction structures 322 are a plurality of convex structures having a coefficient of friction higher than the sleeve 320 and disposed on the outer surface of the sleeve 320 along the longitudinal axis of the sleeve 320 (or slightly tilted relative to the longitudinal axis of the sleeve 320). In some embodiments, the friction structures on the sleeve are non-linear. For example, the friction structures are saw-toothed stripes composed of a plurality of straight line segments or arc segments, or the friction structures are spiral line segments. Alternatively, the angle between any two adjacent straight line segments of the plurality of straight line segments is not always 180 degrees. Optionally, in addition to the linear friction structures, the friction structures may have other regular shapes (for example a plurality of circular, elliptic, square, regular polygonal friction structures are arranged in a strip) or irregular shapes (for example a plurality of polygonal friction structures are arranged in a strip). Moreover, these linear friction structures are substantially evenly distributed on the outer surface of the sleeve. For example, these linear friction structures are evenly distributed on the outer surface of the sleeve, or the density of distributing the linear friction structures on the outer surface of the sleeve is nearly identical.

Moreover, the inner surface of the sleeve 320 is equipped with a plurality of recessed structures, protrusions, embossed structures or dots, and coated with a layer of silver powder or silver paint for allowing the detecting module 340 to clearly identify and detect the rotation or translational movement of the sleeve 320 while increasing the overall sensitivity and resolution and precisely positioning and well operating the cursor. The above descriptions are presented herein for purpose of illustration and description only. It is noted that numerous modifications and alterations may be made while retaining the teachings of the invention. Furthermore, the detecting module 340 can detect the forward/backward rotation and leftward/rightward translational movement of the sleeve 320 by projecting a light beam onto the inner surface of the sleeve 320 from a light-emitting element (not shown). When the sleeve 320 is rotated or moved, the light beam result in different interference phenomena. At the same time, the color, the motion images of the recessed structures, the protrusions or smoothness of the sleeve 320 are continuously detected by the detecting module 340. After the motion images are detected, the moving distance and the trajectory in the X-axis and Y-axis directions are calculated by the microprocessor 371. The calculating result is transmitted to the circuit module 364 through a transmission line (not shown), and then transmitted to the external computer (not shown) through the connecting interface 363, thereby controlling movement of a cursor shown on a display screen of the computer in the X-axis and Y-axis directions. The method of generating the light beam, the method of producing the motion image and the method of calculating the moving distance and the trajectory in the X-axis and Y-axis directions are well know in the art, and are not within the scope of the claims of the present invention. Consequently, these known methods are not redundantly described herein. Moreover, the calculating result may be transmitted in the manner of wire or wireless transmission or both. The connecting interface 363 is for example a USB interface, a PS2 interface or any other wired connecting interface. Alternatively, the connecting interface 363 is an infrared interface, a Bluetooth interface, a radio frequency (RF) interface, or any other wireless connecting interface.

Figure 6:
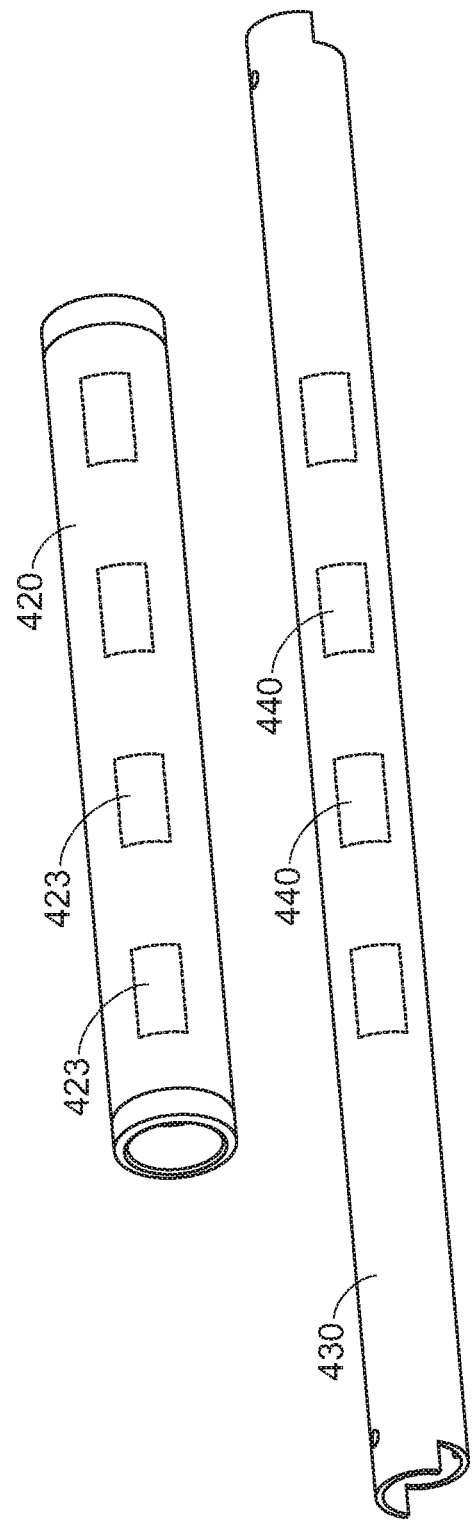
FIG. 6 is a schematic side view illustrating a holder and a sleeve of a control device according to a fourth embodiment of the present invention.

FIG. 6 is a schematic side view illustrating a holder and a sleeve of a control device according to a fourth embodiment of the present invention. In the fourth embodiment, a plurality of detecting modules 440 are accommodated within the accommodation chamber of the holder 430. In addition, a plurality of sensing structures 423 are distributed on the inner surface of the sleeve 420. After the sensing structures 423 are formed on the inner surface of the sleeve 420, the translational movement and the rotation of the sleeve 420 on the holder 430 are not blocked by the sensing structures 423. When the sleeve 420 is move or rotated relative to the holder 430, the interaction between the detecting module 440 and the sensing structures will be correspondingly changed, so that the detecting module 440 generates a moving control signal or a rotating control signal. It is noted that some of the components or modules of the control device in the above embodiments may be included in the control device of the fourth embodiment.

Figure 7:
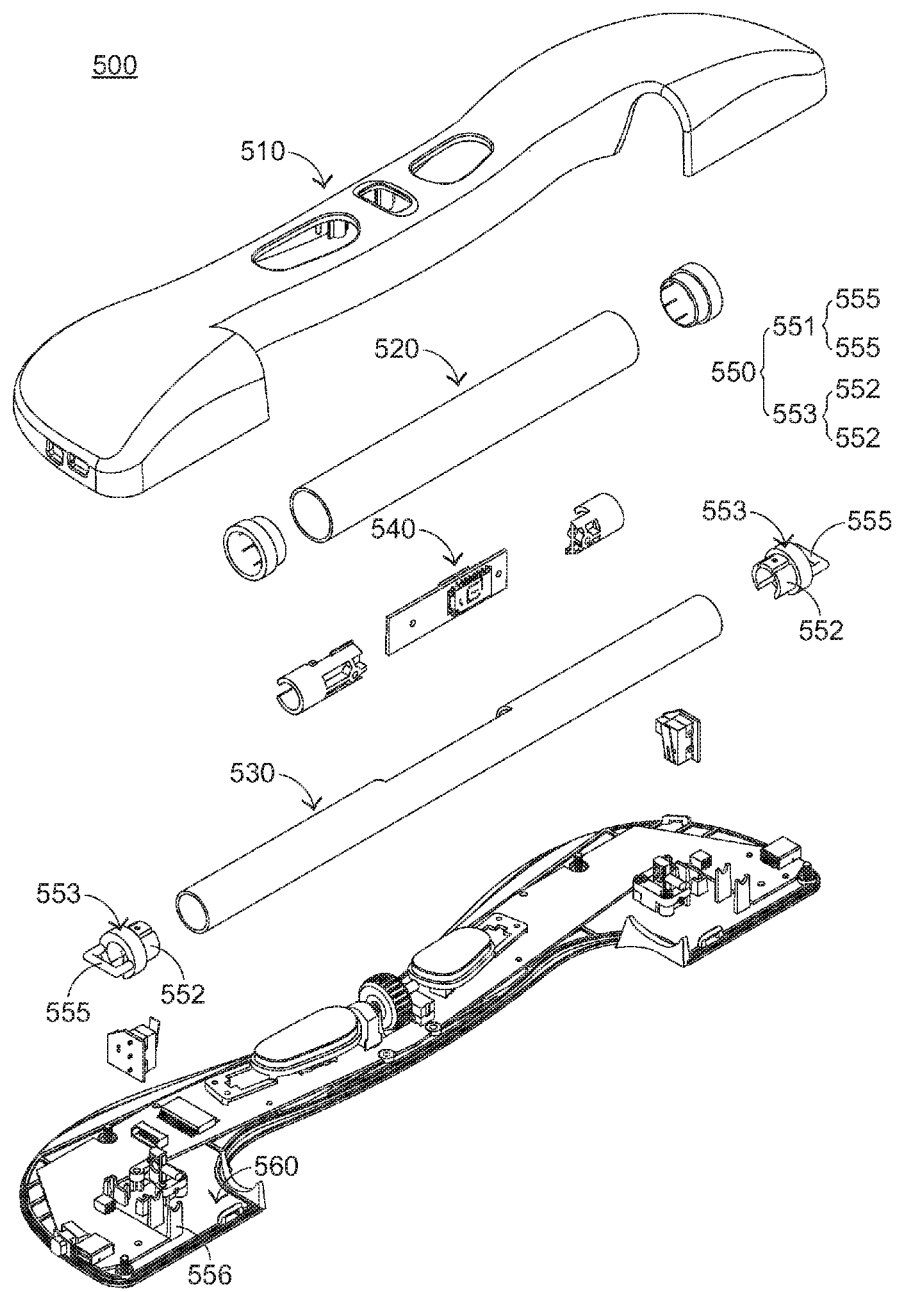
FIG. 7 is a schematic exploded view illustrating a control device according to a fifth embodiment of the present invention.
Figure 8:
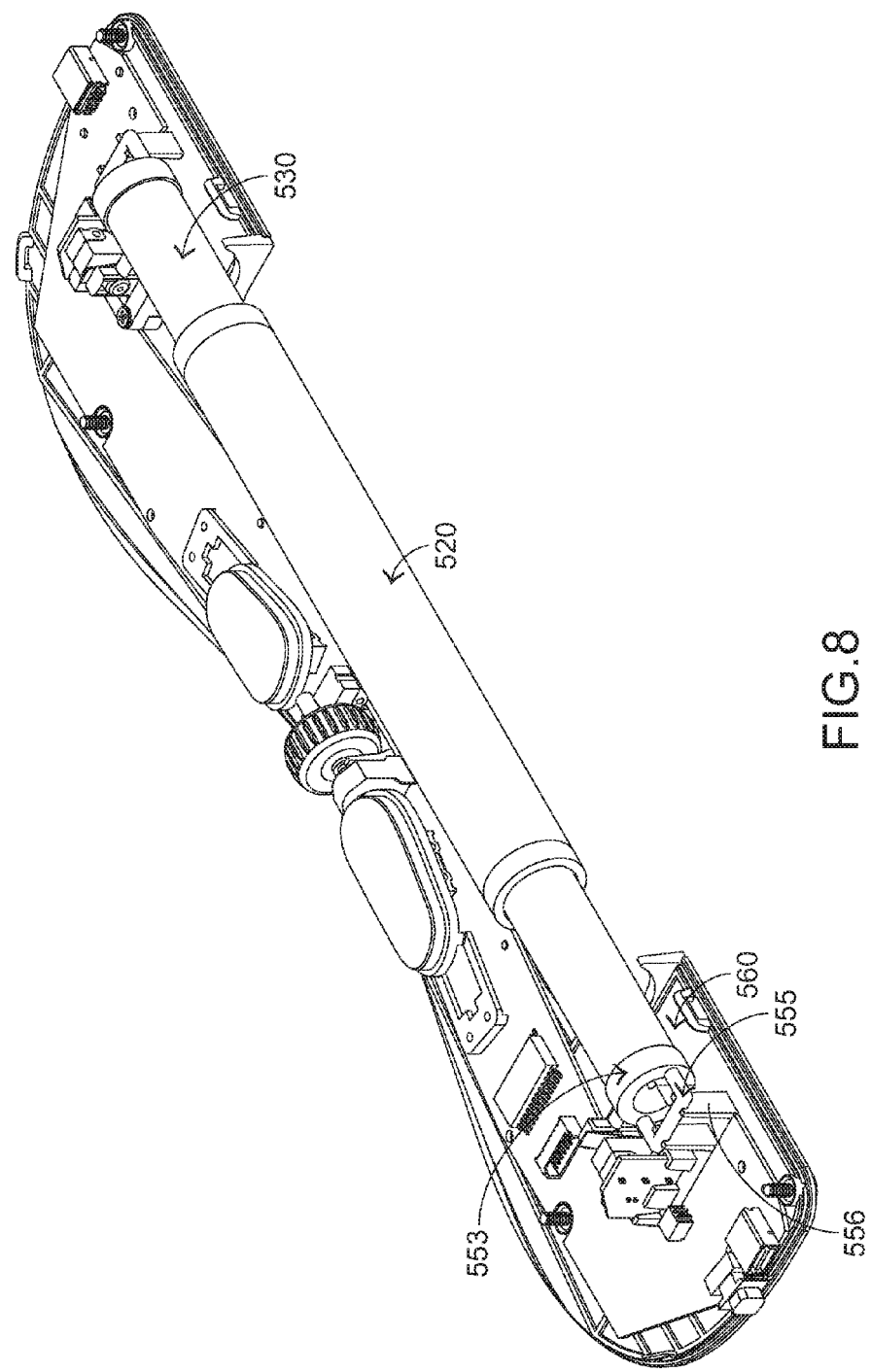
FIG. 8 is a schematic exploded view illustrating some components of the control device according to the fifth embodiment of the present invention.

FIG. 7 is a schematic exploded view illustrating a control device according to a fifth embodiment of the present invention. FIG. 8 is a schematic exploded view illustrating some components of the control device according to the fifth embodiment of the present invention. Please refer to FIGS. 7 and 8. The housing 510, the sleeve 520, the holder 530, the detecting modules 540 and the bottom shell 560 included in the control device 500 of this embodiment are identical to those of the first embodiment, and are not redundantly described herein. In the fifth embodiment, the positioning mechanism 550 comprises a positioning part 551 and a transmission member 553. The positioning part 551 comprises two positioning rods 555. The two positioning rods 555 are vertical to the holder 530 and respectively located at both ends of the holder 530. The transmission member 553 comprises two extension coupling parts 552. The extension coupling part 552 are affixed on both ends of a corresponding positioning rod 555. Moreover, the positioning rod 555 is supported by a corresponding supporting part 556 on the bottom shell 560.

In the above embodiments, the control device is a personal computer, a notebook computer, a mobile phone or any other external electronic device. After the control device is in communication with an interface connecting port of the external computer, the wrist of the user's hand is supported on the wrist rest. Meanwhile, the sleeve may be rotated forwardly/backwardly or moved leftwards/rightwards relative to the first surface of the holder in the X-axis direction or the Y-axis directions with the user's finger. Under this circumstance, the detecting module of the circuit module can continuously calculate the moving distance and the trajectory of the sleeve in the X-axis and Y-axis directions through the first surface or the second surface or the accommodation chamber of the holder in order to control synchronous movement of the cursor on the display screen. In such way, during the control device is operated by the user, the user can maintain the same gesture in order to meet the ergonomic requirements. Moreover, since the holder can facilitate movement of the sleeve within the operating space without causing much friction between the sleeve and the holder, the stability and smoothness of operating the sleeve will be enhanced.

Figure 9:
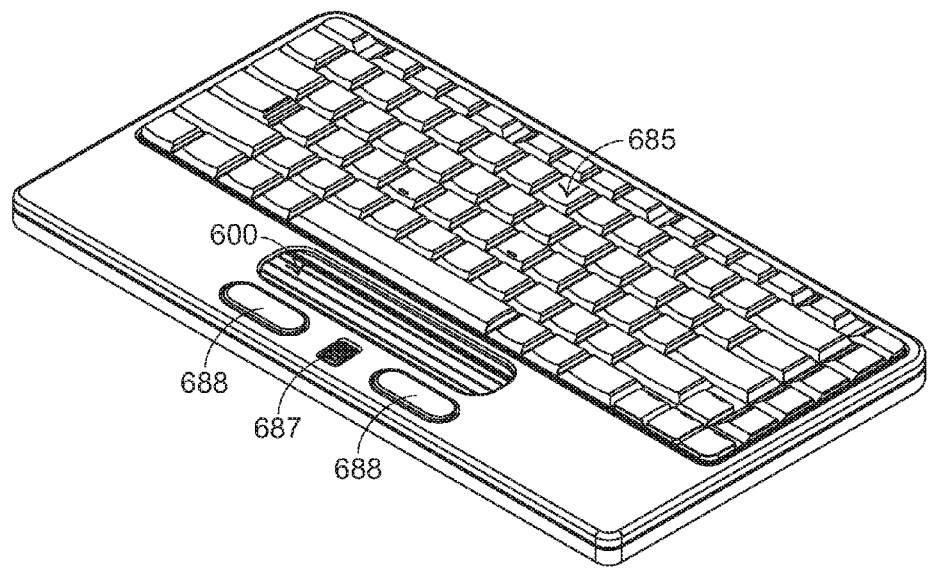
FIG. 9 is a schematic perspective view illustrating the outward appearance of a combination of a control device, a 3D wheel, a control pad and a control module according to a sixth embodiment of the present invention.

Moreover, in the above embodiment, the control device may be equipped with a control module. The control module may have the function of a peripheral device. FIG. 9 is a schematic perspective view illustrating the outward appearance of a combination of a control device, a 3D wheel, a control pad and a control module according to a sixth embodiment of the present invention. As shown in FIG. 9, a control device 600, a 3D wheel 687, a control pad 688 and a control module 685 with a plurality of mechanical keys are integrated into the same housing. The control device 600 is used for controlling the operation of the mouse shown on the display screen. The control module 685 is used for inputting characters. The control device 600 and the control module 685 may be cooperated with each other. The control module 685 is in communication with the control device 600. In addition, signals may be issued to the external electronic device through a connecting interface (not shown) of the control module 685.

Figure 10:
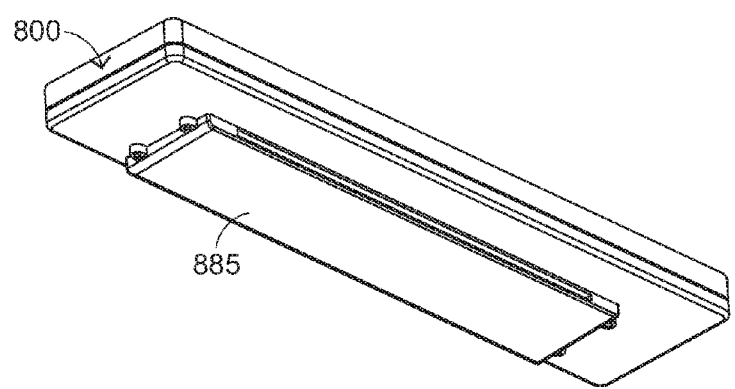
FIG. 10 is a schematic perspective view illustrating the outward appearance of a combination of a feeding scanner and a control device according to a seventh embodiment of the present invention.

FIG. 10 is a schematic perspective view illustrating the outward appearance of a combination of a feeding scanner and a control device according to a seventh embodiment of the present invention. As shown in FIG. 10, the feeding scanner 885 is disposed under the control device 800. During operation, the paper sheets are directly fed into the feeding scanner 885. Since the scanning module is integrated into the control device 800, the functions of the control device 800 are expanded.

Figure 11:
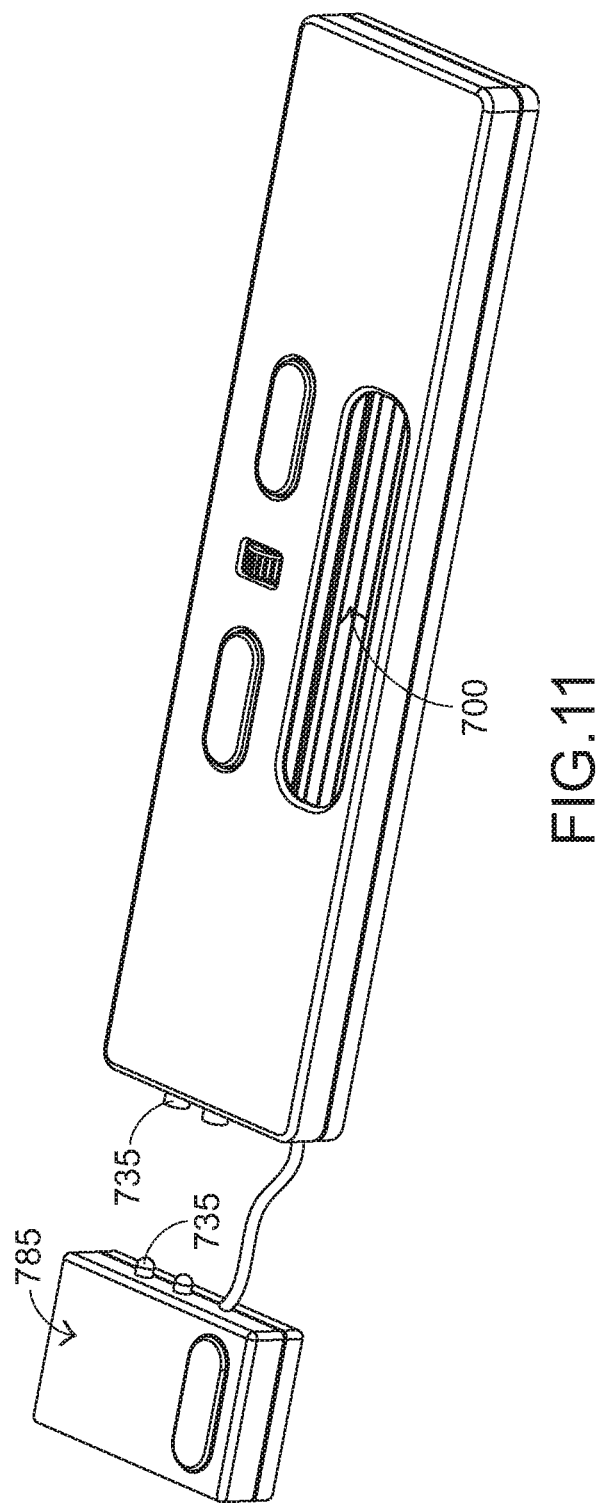
FIG. 11 is a schematic perspective view illustrating the outward appearance of a combination of a control device and a handheld scanning device according to an eighth embodiment of the present invention.

In the above embodiments, the control module and the control device are integrated into a housing. Moreover, the control module having the function of a peripheral device may be operated when the control module is detached from the control device. FIG. 11 is a schematic perspective view illustrating the outward appearance of the combination of a control device and a handheld scanning device according to an eighth embodiment of the present invention. The control device 700 and the handheld scanning device 785 are in communication with each other in the manner of wire or wireless transmission or both. In a case that the control device 700 is not used, the handheld scanning device 785 may be affixed at a side of the control device through a fixing element 735. For operating the handheld scanning device 785, the handheld scanning device 785 should be detached from the control device 700. In addition to the handheld scanning device, the concepts of eighth embodiment may be applied to other peripheral device such as a feeding scanner, a projection module, a camera module, or a combination thereof in order to increase the functions between the control module and the control device.

Figure 12:
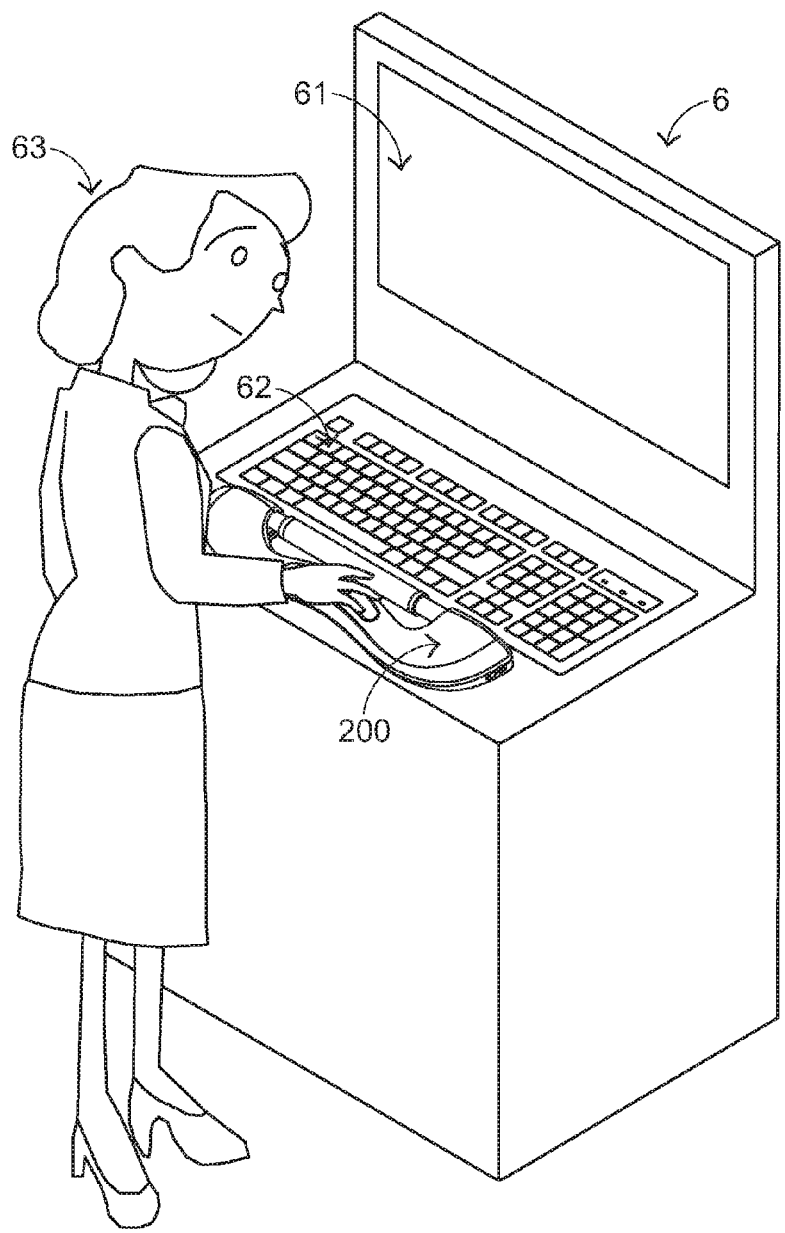
FIG. 12 is a schematic perspective view illustrating an application environment of a control device according to a ninth embodiment of the present invention.

FIG. 12 is a schematic perspective view illustrating an application environment of a control device according to a ninth embodiment of the present invention. For example, the control device 200 of the present invention may be applied to the general affixed-type query machine 6. For example, the query machine 6 is installed in a supermarket for allowing a standing customer 63 to inquire about the product information or operate a virtual shop. Generally, the query machine 6 comprises a display screen 61 and a keyboard device 62. Since the control device 200 of the present invention has small volume, the control device 200 can be installed on a limited platform of the affixed-type query machine 6. Under this circumstance, the control device 200 can be operated by the customer 63 as a mouse. In other words, the control device 200 of the present invention can facilitate the customer 63 to operate the affixed-type query machine 6.

Figure 13:
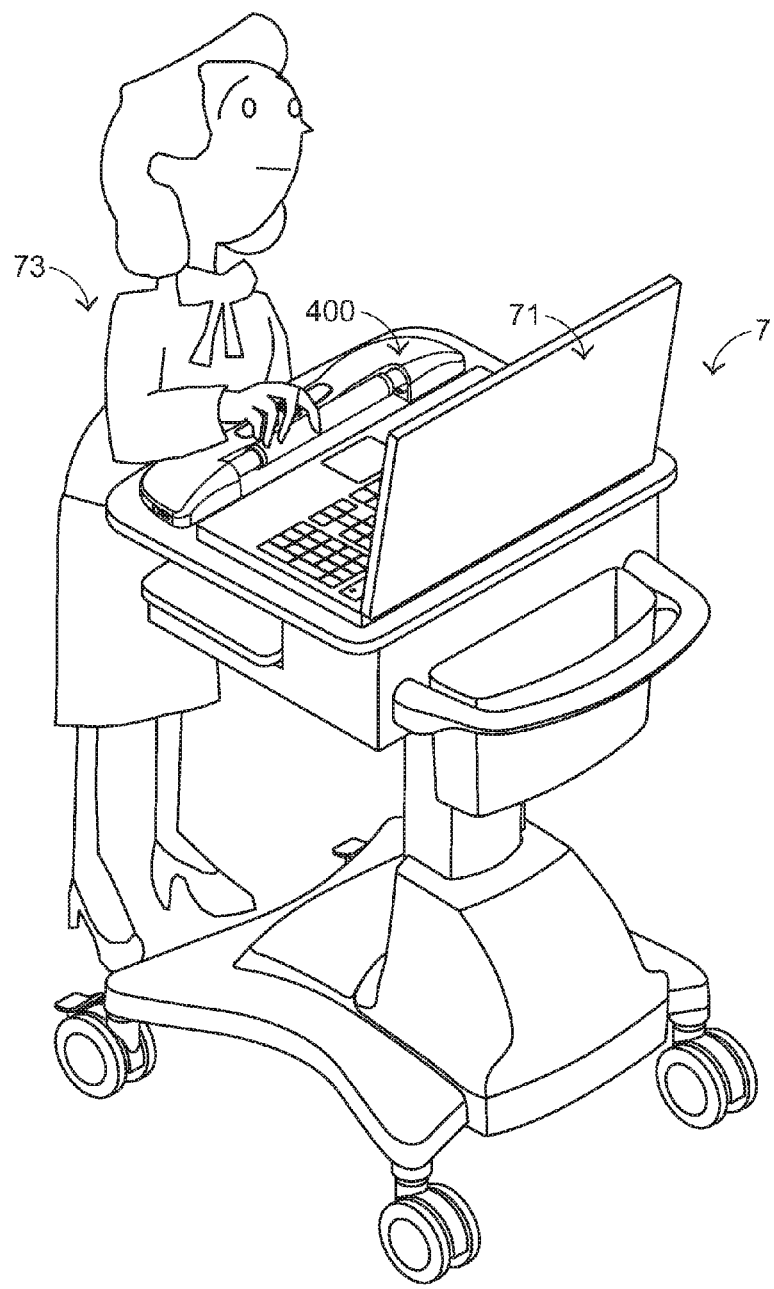
FIG. 13 is a schematic perspective view illustrating another application environment of a control device according to a tenth embodiment of the present invention.

FIG. 13 is a schematic perspective view illustrating another application environment of a control device according to a tenth embodiment of the present invention. The control device 400 of the present invention may be applied to a movable workstation 7 such as a movable workstation of a medical unit. In views of the mobile convenience, the general movable workstation 7 has a limited space for placing an electronic device 71. The limited area of the platform of the movable workstation 7 becomes hindrance from operating the mouse by a standing worker 73. Since the control device 400 of the present invention only needs affixed and limited space, the control device 400 can be operated by the worker 73 as a mouse. Moreover, since it is not necessary to move the control device 400 during the control device 400 is operated, the operating convenience is enhanced.

From the above description, the control device of the present invention is suitably applied to a platform environment with a limited space. The control device of the present invention is easily operated by the standing user in order to enhance the flexibility of operating the electronic device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control device for controlling movement of a cursor of an electronic device, said control device comprising:
   a holder defining an accommodation chamber therein;
   a sleeve sleeved onto said holder, wherein said sleeve is rotatable and movable on said holder;
   a detecting module accommodated within said accommodation chamber for detecting a rotation and a translational movement of said sleeve;
   a sensor optionally triggered to generate a control signal; and
   a positioning mechanism comprising a positioning part and a transmission member, wherein said transmission member includes two extension coupling parts connecting said positioning part to opposite ends of said holder, respectively, and a pressing part assembled to said positioning part between said two extension coupling parts and aligned with said sensor, wherein when said holder generates a first vertical displacement, said pressing part of said transmission member is transmitted through said positioning part to generate a second vertical displacement in response to said first vertical displacement of said holder, and said first vertical displacement is different from said second vertical displacement.

2. The control device according to claim 1, wherein said holder further comprises a light-transmissible zone or a vacant zone sheltered by said sleeve and aligned with said detecting module.

3. The control device according to claim 2, wherein said sleeve is hard or flexible,
   wherein in case of said hard sleeve, said holder further comprises a supporting seat for supporting said detecting module and a one-piece fixing part sheathed around said supporting seat, wherein said one-piece fixing part is coupled with at least a portion of said transmission member; or
   wherein in case of said hard sleeve, said holder further comprises a supporting seat for supporting said detecting module and an assembled fixing part sheathed around said supporting seat, wherein said assembled fixing part is coupled with at least a portion of said transmission member; or
   wherein in case of said hard sleeve, said hard sleeve is made of mesh fabric, nonwoven fabric, plastic material, rubber or leather;
   wherein in case of said flexible sleeve, said holder sleeved by said flexible sleeve has a flat, arc-shaped, circular or elliptical cross section; or
   wherein in case of said flexible sleeve, a plurality of friction structures are formed on an outer surface of said flexible sleeve, wherein said friction structures are substantially evenly distributed on said outer surface of said flexible sleeve; or
   wherein in case of said flexible sleeve, said flexible sleeve comprises a plurality of recessed structures, protrusions, embossed structures or dots, which are distributed on an inner surface of said flexible sleeve, wherein said inner surface of said flexible sleeve faces said detecting module; or
   wherein said sleeve further comprises at least one sensing structure formed on an inner surface of said sleeve, wherein said inner surface of said sleeve faces said detecting module, wherein at least one of a relative rotation and a relative translational movement between said sensing structure and said detecting module is detected by said detecting module.

4. The control device according to claim 1, wherein said control device further comprises:
   a bottom shell where said positioning part and said sensor are disposed, wherein said sensor is a contact sensor triggered by contact with said pressing part to generate said control signal; or said sensor is a non-contact sensor triggered by interference with said pressing part to generate said control signal.

5. The control device according to claim 1, wherein said positioning part comprises a positioning shaft parallel to said holder, said two extension coupling parts are respectively affixed on both ends of said positioning shaft, and said pressing part has a fixed end affixed on said positioning shaft and a free end aligned with said sensor, wherein said pressing part is configured to have said free end generate said second vertical displacement smaller than said first vertical displacement in response to said first vertical displacement of said holder.

6. The control device according to claim 1, further comprising a bottom shell, a circuit module, and a peripheral device, wherein said positioning mechanism is disposed on said bottom shell, said circuit module is disposed on said bottom shell, and said peripheral device is in communication with said circuit module in the manner of a wire or wireless transmission, wherein said peripheral device comprises a keyboard with a plurality of keys and a 3D wheel, a touchpad, a touch display panel, a handheld scanning device, a feeding scanning device, a projection module, a camera module, an industrial computer or host, a commercial computer or host, a medical computer or host, a handheld electronic device, or a combination of at least two of said peripheral devices.

7. A control device for controlling movement of a cursor of an electronic device, said control device comprising:
   a holder defining an accommodation chamber therein;
   a sleeve sleeved onto said holder, wherein said sleeve is rotatable and movable on said holder;
   a detecting module accommodated within said accommodation chamber for detecting a rotation and a translational movement of said sleeve;
   a control module at least comprising a peripheral device;
   a circuit module in communication with said detecting module and in communication with said peripheral device;

a sensor optionally triggered to generate and issue a control signal to said circuit module; and a positioning mechanism comprising a positioning part and a transmission member, wherein said transmission member includes two extension coupling parts connecting said positioning part to opposite ends of said holder, respectively, and a pressing part assembled to said positioning part between said two extension coupling parts and aligned with said sensor, wherein when said holder generates a first vertical displacement, said pressing part of said transmission member is transmitted through said positioning part to generate a second vertical displacement in response to said first vertical displacement of said holder, and said first vertical displacement is different from said second vertical displacement.

8. The control device according to claim 7, wherein said holder further comprises a light-transmissible zone or a vacant zone sheltered by said sleeve and aligned with said detecting module.

9. The control device according to claim 8, wherein said sleeve is hard or flexible,
wherein in case of said hard sleeve, said holder further comprises a supporting seat for supporting said detecting module and a one-piece fixing part sheathed around said supporting seat, wherein said one-piece fixing part is coupled with at least a portion of said transmission member; or
wherein in case of said hard sleeve, said hard holder further comprises a supporting seat for supporting said detecting module and an assembled fixing part sheathed around said supporting seat, wherein said assembled fixing part is coupled with at least a portion of said transmission member; or
wherein in case of said hard sleeve, said hard sleeve is made of mesh fabric, nonwoven fabric, plastic material, rubber or leather; or
wherein in case of said flexible sleeve, said holder sleeved by said flexible sleeve has a flat, arc-shaped, circular or elliptical cross section; or
wherein in case of said flexible sleeve, a plurality of friction structures are formed on an outer surface of said flexible sleeve, wherein said friction structures are substantially evenly distributed on said outer surface of said flexible sleeve; or
wherein in case of said flexible sleeve, said flexible sleeve comprises a plurality of recessed structures, protrusions, embossed structures or dots, which are distributed on an inner surface of said flexible sleeve, wherein said inner surface of said flexible sleeve faces said detecting module; or
wherein said sleeve further comprises at least one sensing structure formed on an inner surface of said sleeve, wherein said inner surface of said sleeve faces said detecting module, wherein at least one of a relative rotation and a relative translational movement between said sensing structure and said detecting module is detected by said detecting module.

10. The control device according to claim 7, further comprising:
a bottom shell for accommodating said peripheral device and connecting with said peripheral device, wherein said peripheral device is operable when said peripheral device is detached from said bottom shell, wherein said peripheral device is in communication with said circuit module in the manner of a wire or wireless transmission, wherein said peripheral device comprises a handheld scanning device, a feeding scanning device, a projection module, a camera module, a keyboard with at least one key and a 3D wheel, or a combination of at least two of said peripheral devices; or
a bottom shell for accommodating said peripheral device and said circuit module, wherein said peripheral device is in communication with said circuit module in the manner of a wire or wireless transmission, wherein said peripheral device comprises a touchpad, a touch display panel, a handheld scanning device, a feeding scanning device, a projection module, a camera module, a keyboard with at least one key and a 3D wheel, or a combination of at least two of said peripheral devices; or
said peripheral device is in communication with said circuit module in the manner of a wire or wireless transmission, wherein said peripheral device comprises a handheld scanning device, a feeding scanning device, a projection module, a camera module, an industrial computer or host, a commercial computer or host, a medical computer or host, a handheld electronic device, a keyboard with a plurality of keys and a 3D wheel, or a combination of at least two of said peripheral devices.

11. The control device according to claim 7, wherein said control device further comprises:
a bottom shell where said positioning part and said sensor are disposed wherein said sensor is a contact sensor triggered by contact with said pressing part to generate said control signal; or said sensor is a non-contact sensor triggered by interference with said pressing part to generate said control signal.

12. The control device according to claim 7, wherein
said positioning part comprises a positioning shaft parallel to said holder, said two extension coupling parts are respectively affixed on both ends of said positioning shaft, and said pressing part has a fixed end affixed on said positioning shaft and a free end aligned with said sensor, wherein said pressing part is configured to have said free end generate said second vertical displacement smaller than said first vertical displacement in response to said first vertical displacement of said holder.

13. The control device according to claim 7, wherein said peripheral device is in communication with said circuit module in the manner of a wire or wireless transmission, wherein said peripheral device comprises a handheld scanning device, a feeding scanning device, a projection module, a camera module, an industrial computer or host, a commercial computer or host, a medical computer or host, a handheld electronic device, a keyboard with a plurality of keys and a 3D wheel, a touchpad, a touch display panel, or a combination of at least two of said peripheral devices.

14. The control device according to claim 7, wherein said circuit module comprises a microprocessor, wherein said detecting module is in communication with said microprocessor, and said detecting module issues at least one of a rotating control signal and a moving control signal to said microprocessor.

15. The control device according to claim 7, wherein said control module is in communication with said circuit module in the manner of a wire or wireless transmission, wherein said control module comprises at least one mechanical key, a touchpad, a touch display panel, a wheel, a non-contact panel or a display panel, a keyboard with at least one key and a 3D wheel, or a combination of at least two of said control modules.

* * * * *